US006916025B2

(12) United States Patent
Brisson

(10) Patent No.: US 6,916,025 B2
(45) Date of Patent: Jul. 12, 2005

(54) PISTON AND SEAL FOR A STORAGE TANK

(75) Inventor: Gene Brisson, Bladenboro, NC (US)

(73) Assignee: Piston Technology, LLC, Elizabethtown, NC (US)

( * ) Notice: Subject to any disclaimer, the term of this patent is extended or adjusted under 35 U.S.C. 154(b) by 364 days.

(21) Appl. No.: 10/268,154

(22) Filed: Oct. 10, 2002

(65) Prior Publication Data

US 2004/0069813 A1 Apr. 15, 2004

(51) Int. Cl.[7] .................................................. F16J 9/00
(52) U.S. Cl. ....................................... 277/637; 222/648
(58) Field of Search ................................ 277/644, 647, 277/648, 637, 640; 222/386

(56) References Cited

U.S. PATENT DOCUMENTS

| | | | | | |
|---|---|---|---|---|---|
| 1,945,153 | A | | 1/1934 | Marsh | |
| 3,334,774 | A | * | 8/1967 | Poltorak | 277/648 |
| 3,722,895 | A | | 3/1973 | Mevissen | |
| 4,721,235 | A | | 1/1988 | Watson | |
| 4,934,715 | A | * | 6/1990 | Johnson | 277/647 |
| 5,114,054 | A | | 5/1992 | Watson | |
| 5,341,726 | A | | 8/1994 | Watson | |
| 5,385,081 | A | | 1/1995 | Sneddon | |
| 5,746,112 | A | | 5/1998 | Watson | |
| 5,794,941 | A | | 8/1998 | Lahrman | |
| 5,882,605 | A | | 3/1999 | Sortwell | |
| 6,027,123 | A | | 2/2000 | Berry, Sr. et al. | |
| 6,206,248 | B1 | | 3/2001 | Popp et al. | |
| 6,217,029 | B1 | | 4/2001 | Weiler | |
| 6,302,399 | B1 | | 10/2001 | Prinzing | |
| 6,325,384 | B1 | | 12/2001 | Berry, Sr. et al. | |

* cited by examiner

*Primary Examiner*—Philippe Derakshani
(74) *Attorney, Agent, or Firm*—Coats & Bennett, P.L.L.C.

(57) ABSTRACT

A tank for storing fluid materials includes a piston having a channel, and an annular seal secured to the channel. The annular seal projects outwardly from the circumference of the piston. The piston further includes a plurality of radially arranged, spaced-apart tensioners that stretch the seal into sliding engagement with the interior surface of the tank. As the piston slides through the tank, the tensioners independently move radially inward and outward to compensate for shape-wise imperfections of the tank, such that the fluid materials extrude through the opening of the tank without bypassing the annular seal.

33 Claims, 6 Drawing Sheets

PISTON AND SEAL FOR A STORAGE TANK

BACKGROUND OF THE INVENTION

The present invention relates generally to storage tanks for storing fluid materials, and in particular, to an improved piston for use in extruding the fluid stored therein.

Storage tanks, particularly those used in the transportation of viscous, fluid materials, typically comprise a piston that moves along a longitudinal axis in the tank to push the materials through and out an opening in one end of the tank. The piston typically includes a seal that "wipes" the interior surface of the tank, and prevents the backflow of material as the piston moves along the longitudinal axis. Problems may arise, however, when the tank is not perfectly round or has imperfections in the surface. For example, gaps may form between the seal and the interior surface of the tank allowing material to squeeze past the piston. Therefore, a mechanism is needed that will maintain a firm contact between the seal and the inner surface of the tank without creating unnecessary friction, thereby preventing the backflow of material past the piston.

SUMMARY OF THE INVENTION

A storage tank used to transport fluid materials includes a piston slidably mounted in the tank, an annular seal extending around the circumference of the piston, and a plurality of radially movable tensioners that maintain the seal in sliding engagement with the inner surface of the tank. Each tensioner includes an adjustment mechanism to adjust the amount of force applied by the tensioner. In one embodiment, approximately 16 tensioners are spaced around the piston. The tensioners can be independently adjusted to compensate for variations in the tank. The tensioners hold the seal in contact with the inner surface of the tank as the piston moves along the tank.

DETAILED DESCRIPTION OF THE INVENTION

Figure 1:
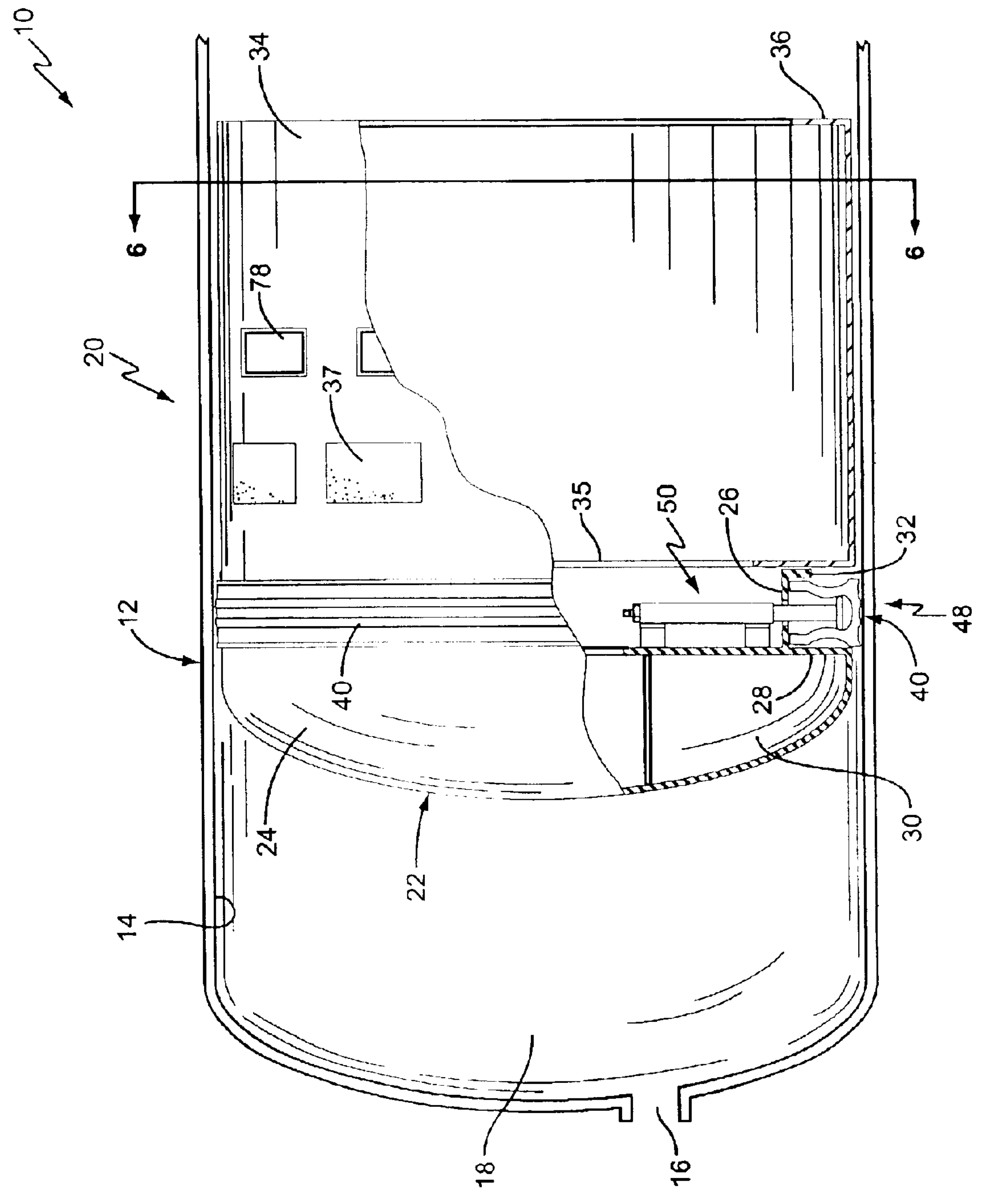
FIG. 1 is a side view of one embodiment of the present invention showing the piston disposed inside a storage tank.

Referring now to FIG. 1, one embodiment of a storage tank according to the present invention is shown therein, and indicated generally by the number 10. Storage tank 10 comprises a tank 12 having an inner surface 14, and a piston 20 disposed within the tank 12 for expelling a fluid material 18 through and out an opening 16, an annular seal 40 extending around the piston 20, and a plurality of radially moveable tensioners 50 to maintain the seal 40 in contact with the inner surface of the tank 12.

Tank 12 is normally cylindrical, and is preferably constructed from a non-corrosive material, such as stainless steel. Further, tank 12 may be mounted to a vehicle for transporting fluid materials 18 or may be stationary. A tank for mounting on a semi-trailer may, for example, be approximately 63 inches in diameter and approximately 40 feet in length. The tank 12 may be used to transport and/or store many types of fluid material 18, including food products such as peanut butter and processed meats.

Piston 20 is disposed within the tank 12 and moves along the longitudinal axis of the tank 12. The piston 20 is slightly smaller in diameter than the tank 12 and is mounted for sliding movement within the tank 12. The piston 24 includes a head 22 and a body 34, which may be constructed as separate pieces and coupled by any suitable means, such as by mechanical fasters.

The head 22 includes an dome-shaped front section 24 that contacts the fluid material 18 within the tank 12, and cylindrical mounting collar 26. A ring-shaped mounting plate 28 is welded or otherwise secured to the interior of the front section 24 and is supported by gusset plates 30. The mounting collar 26 may be welded to the mounting plate 28, and extends rearwardly to terminate in a flange 32.

The body 34 comprises a cylindrical member having a front flange 35, and a rear flange 36 to provide rigidity. The front flange 35 of the body 34 couples to the flange 32 on the head 22 of the piston 20. Bolts 39 (see FIG. 4) secure the two sections of the piston 20 together. When the head 22 and body 34 are secured together, a circumferential channel 48 is formed. The collar 26 forms the bottom of the channel 48, the mounting plate 28 forms one sidewall of the channel 48, and the front flange 35 on the body 34 forms the other sidewall of the channel 48. This channel 48 extends around the piston 20 and contains the seal 40 as described below.

The body 34 further includes plurality of circumferentially spaced access openings 37. The access openings 37 allow installers and maintenance personnel to inspect or examine the seal 40 from the inside of the piston 20 when the piston 20 is installed in the tank 12. Installers and maintenance workers can use the access openings 37, for example, to check for gaps between the seal 40 and the inner surface of the tank 12 after the piston 20 is installed in the tank 12. The installers may then adjust the tensioners 50 as needed to ensure that the seal 40 fits snugly against the inner surface of the tank 12.

Figure 2:
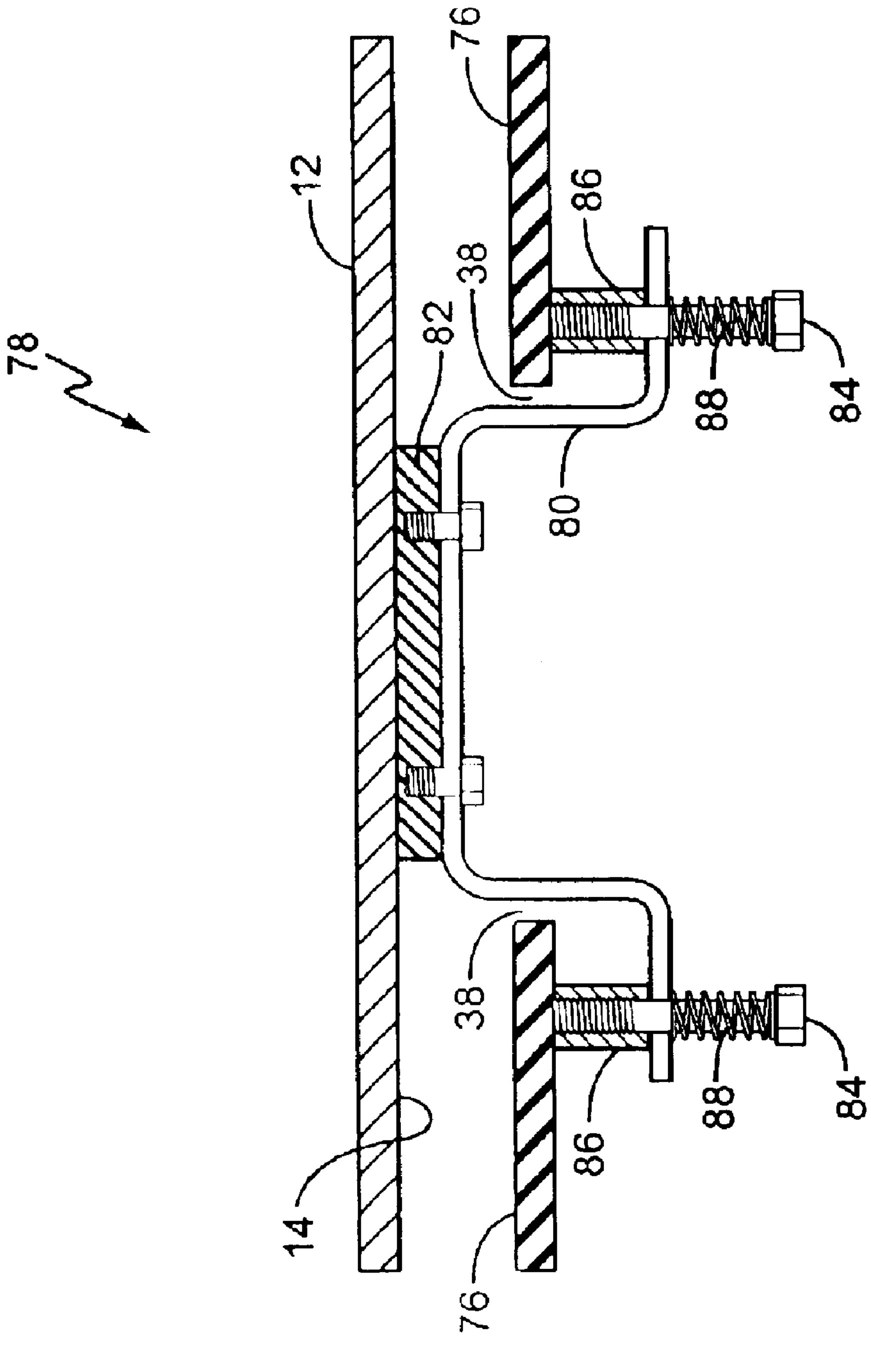
FIG. 2 is a cross-sectional view of an anti-canting member according to one embodiment of the present invention.

The body 34 includes a second series of circumferentially spaced openings 38 for anti-canting members 78, which are shown in FIG. 2. Anti-canting members 78 ensure that the piston 20 does not skew or tilt from side to side when the piston 20 moves along the longitudinal axis of tank 12. In the disclosed embodiment, 12 anti-canting members are evenly spaced around the circumference of the piston 20. The number of anti-canting members 78 is not material to the present invention and those skilled in the art will readily appreciate that a different number of anti-canting members 78 could be used.

Anti-canting members 78 each comprise a spring-mounted bracket 80 and an anti-canting pad 82 attached to the bracket 80. The bracket is made from a non-corrosive material, such as stainless steel. The anti-canting pad 82 is preferably made from a non-stick material, such as Ultra-High Molecular Weight plastic (UHMW), and is secured to the anti-canting bracket 80 by mechanical fasteners, such as screws. The anti-canting bracket 80 moves radially inward and outward on a pair of threaded guide rods 84 that are secured to the interior of the piston body 34. More particularly, a pair of internally threaded spacers 86 are welded or otherwise secured to the interior of the piston body 34 on opposing sides of the opening 38. The spacers 86 provide a fixed minimum separation distance between the anti-canting bracket 80 and the interior of body 34. The guide rods 84 thread into the spacers 86. A spring 88 disposed on each guide rod 84 biases the anti-canting bracket 80 outwardly towards the inner surface 14 of tank 12. As the piston 20 moves along the longitudinal axis of tank 12 towards the opening 16, the anti-canting pad 82 slidably engages the inner surface 14 of tank 12 to prevent the piston 20 from tilting or skewing in the tank 12 as the piston moves along the tank 12.

Figure 3:
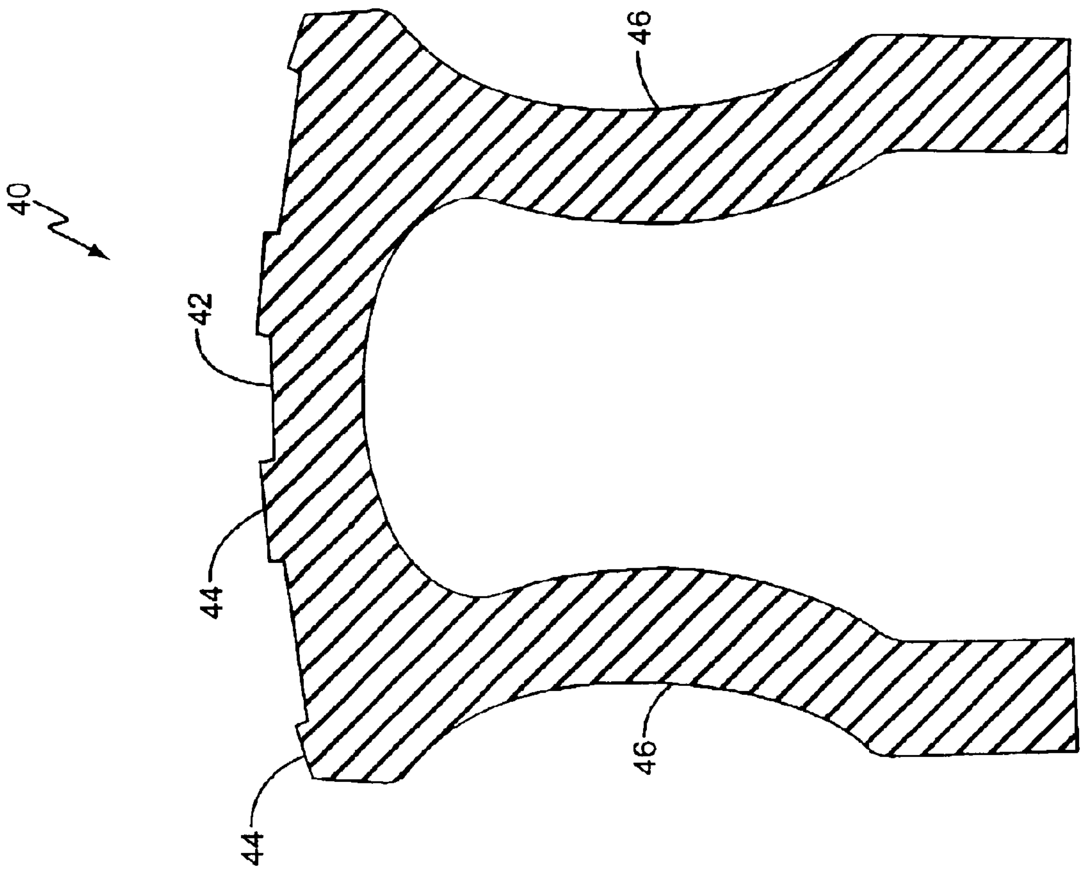
FIG. 3 is a cross-sectional view of the seal according to one embodiment of the present invention.

FIG. 3 is a cross-section of the seal 40. Seal 40 comprises an arcuate crown 42 having a plurality of ridges 44 disposed thereon, a pair of opposing legs 46, and an interior surface. Seal 40 may be manufactured using any material known in the art, but is preferably cast as a unitary construction from a generally pliable non-toxic material, such as rubber or a related rubber compound. Further, seal 40 forms a continuous ring that is approximately equal in diameter to the inside diameter of the tank 12.

In this embodiment, ribs or ridges 44 are arranged to include a pair of outer ridges, or peripheral ridges, and a pair of interior ridges. The ridges 44 contact and slidingly engage the interior surface 14 of tank 12 as the piston moves towards the opening 16, and substantially wipes the inner surface 14 clean of fluid material 18. Thus, ridges 44 offer an improvement over existing seals by presenting less surface area to the interior surface 14. This results in less friction and less wear and tear to the crown 42, while simultaneously preventing the backflow of fluid material 18 beyond the piston member 20. Those skilled in the art will readily appreciate that the number and arrangement of the ridges 44 is not material to the invention, and in fact, both the number and arrangement of the ridges 44 may be varied in any pattern along the crown 42 of seal 40. The legs 46 of the seal 40 have concave outer surfaces that allows the seal 40 to stretch radially outward when biased by tensioner 50. When the biasing force is removed, the legs 46 return to a normal unstretched state due to the natural resiliency of the material. The material is preferably chosen so that the seal 40 may withstand prolonged stretching and still return to an unstretched state.

Figure 4:
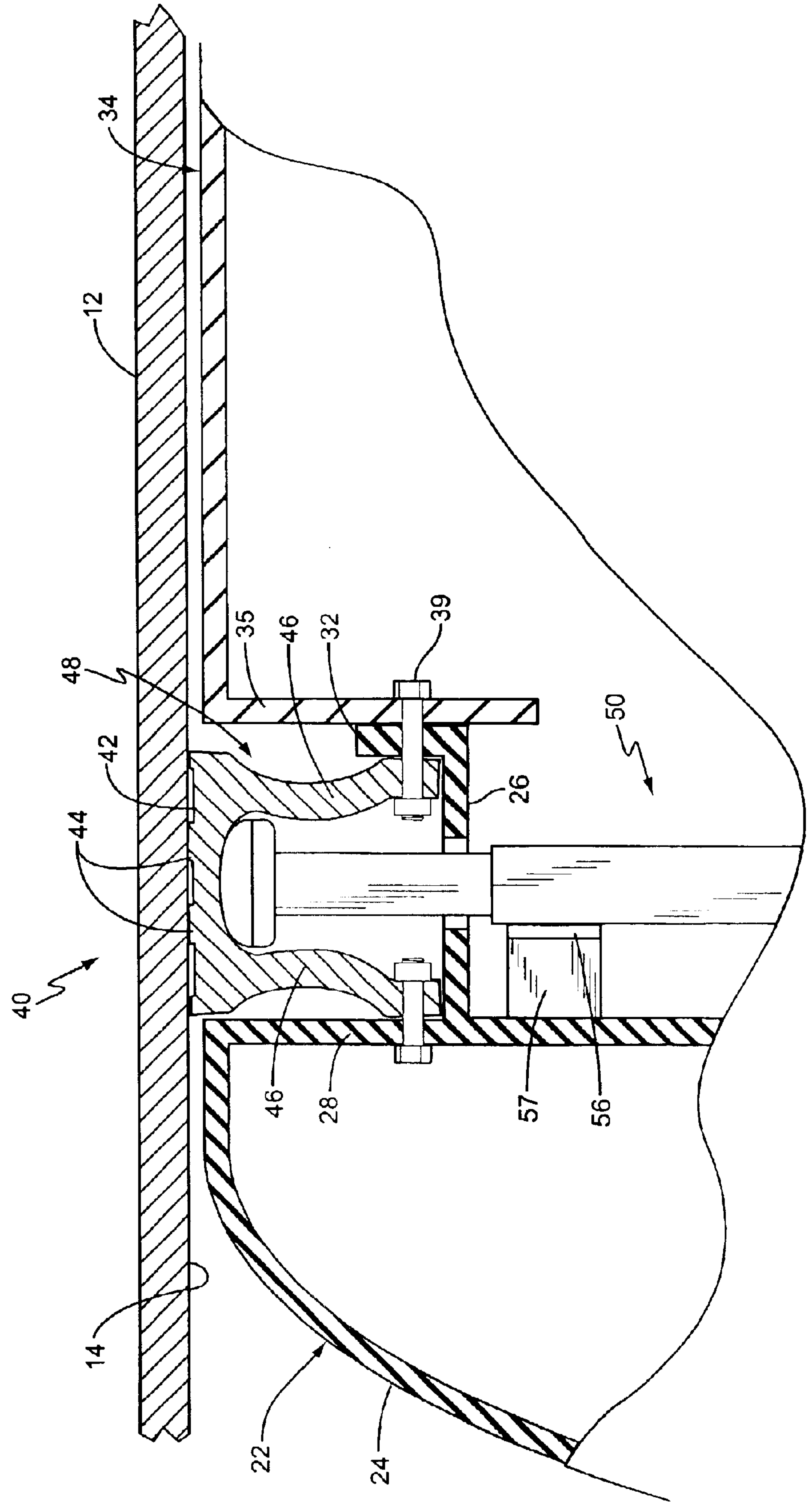
FIG. 4 is a cross-sectional view of one embodiment of the present invention illustrating the seal mounted to the piston.

As previously stated, the seal 40 mounts in the channel 48 created when the head 22 and body 34 of piston 20 are coupled. As shown in FIG. 4, the legs 46 of the seal 40 are bolted to opposing sidewalls of the channel 48 by bolts 39. The bolts 39, as shown in FIG. 4, may be the same bolts used to secure the head 22 and body 34 of the piston together. However, those skilled in the art will realize that various means may be employed to secure both the seal 40 within the channel.

As the piston moves toward the opening 16, the seal 40 must compensate for variations in the tank 12. The present invention achieves this goal by providing a plurality of tensioners 50 to hold the seal 40 against the inner surface 14 of the tank 12. The tensioners 50 exert an outward force on the seal 40 to hold the seal in contact with the inner surface of the tank 12 as the piston moves along the tank 12. The tensioners 50 are responsive to the variations in the inner surface 14 of the tank 12, and maintain the seal 40 in sliding engagement with the inner surface 14 of tank 12 by moving radially inward and outward.

Figure 5:
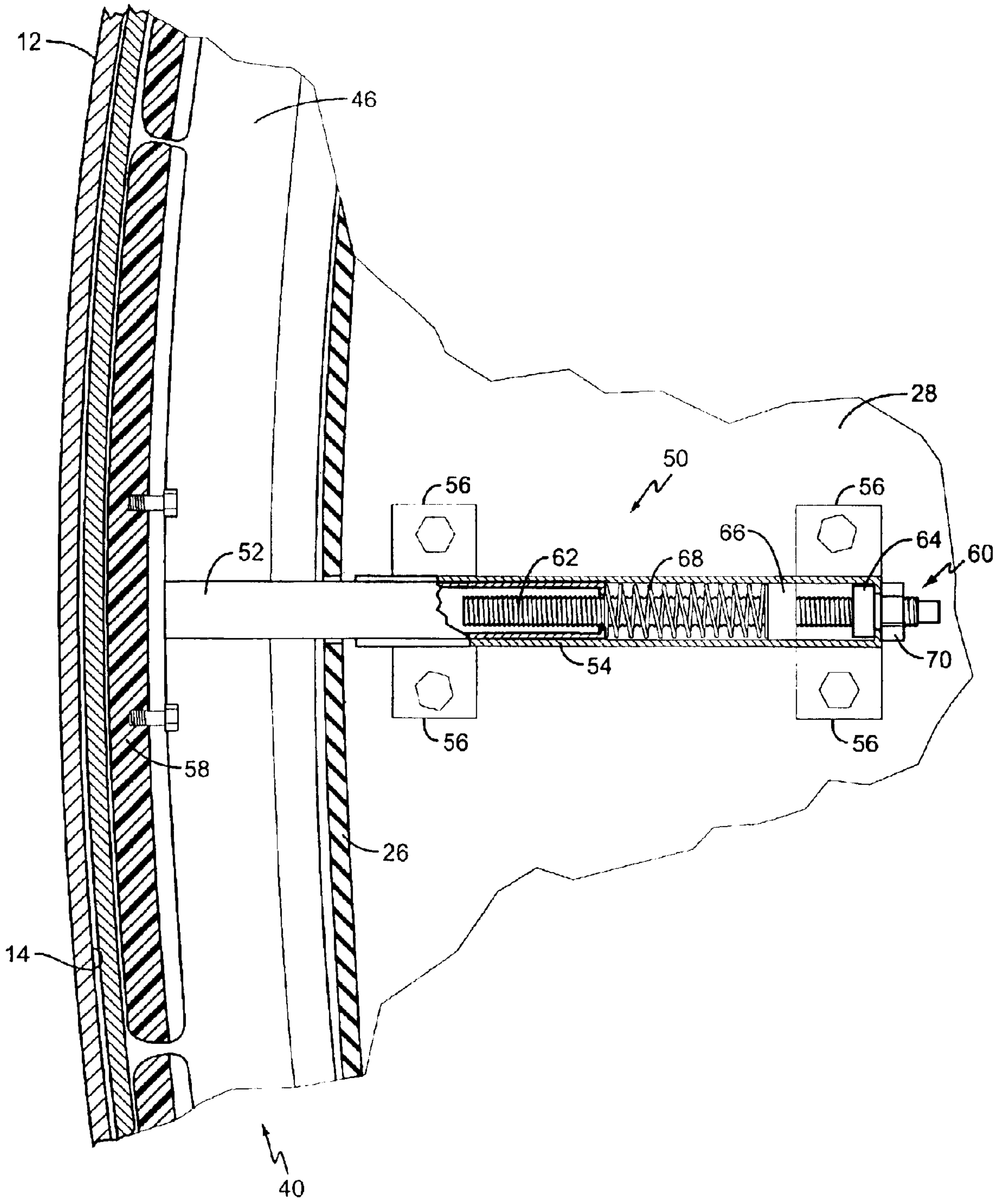
FIG. 5 is a cross-sectional view of an exemplary tensioner according to one embodiment of the present invention.

FIG. 5 illustrates one tensioner 50 in more detail. Tensioner 50 comprises a shaft 52 having a tensioner pad 58 mounted at one end, and a sleeve 54 to receive the other end of shaft 52. Mounting brackets 56 are secured to the sleeve to facilitate mounting tensioner 50 to the head 22 of piston 20. Those skilled in the art will readily appreciate the numerous ways in which to secure tensioner 50 to the head 22. However, in this embodiment, mechanical fasteners secure tensioner 50 to a spacer block 57 that is welded or otherwise secured to mounting plate 28 of head 22. Spacer block 57 is tapped to include one or more threaded holes that receive the mechanical fasteners, and substantially align tensioner 50 with the interior surface of the seal 40 in channel 48.

A biasing member 68, which in this embodiment is a compression spring, biases the shaft 52 radially outward through an opening in the collar 26, and into engagement with the interior surface of seal 40. As the tensioner 50 engages the seal 40, the biasing force imparted by the biasing member 68 stretches the seal 40. Tensioner 50 includes an adjusting mechanism 60 that allows adjustment of the force imparted by biasing member 68. The adjustment mechanism 60 comprises a threaded bolt 62 housed in sleeve 54. The biasing member 68 is disposed around threaded bolt 62, and rests on a base 66. A stopper 64 prevents the threaded bolt 62 from falling out of the sleeve 54, while an exterior nut 70 prevents any unwanted rotations of threaded bolt 62 during use. To adjust the amount of biasing force, a user loosens the exterior nut 70, and turns the threaded bolt 62 to the right or left, depending on whether or not more or less biasing force is required. Upon reaching the correct amount of biasing force, the user simply re-tightens the exterior nut 70. This process may be repeated for each of the plurality of tensioners 50, thereby allowing a user to independently adjust the amount of force imparted by each tensioner 50 to the seal 40.

Figure 6:
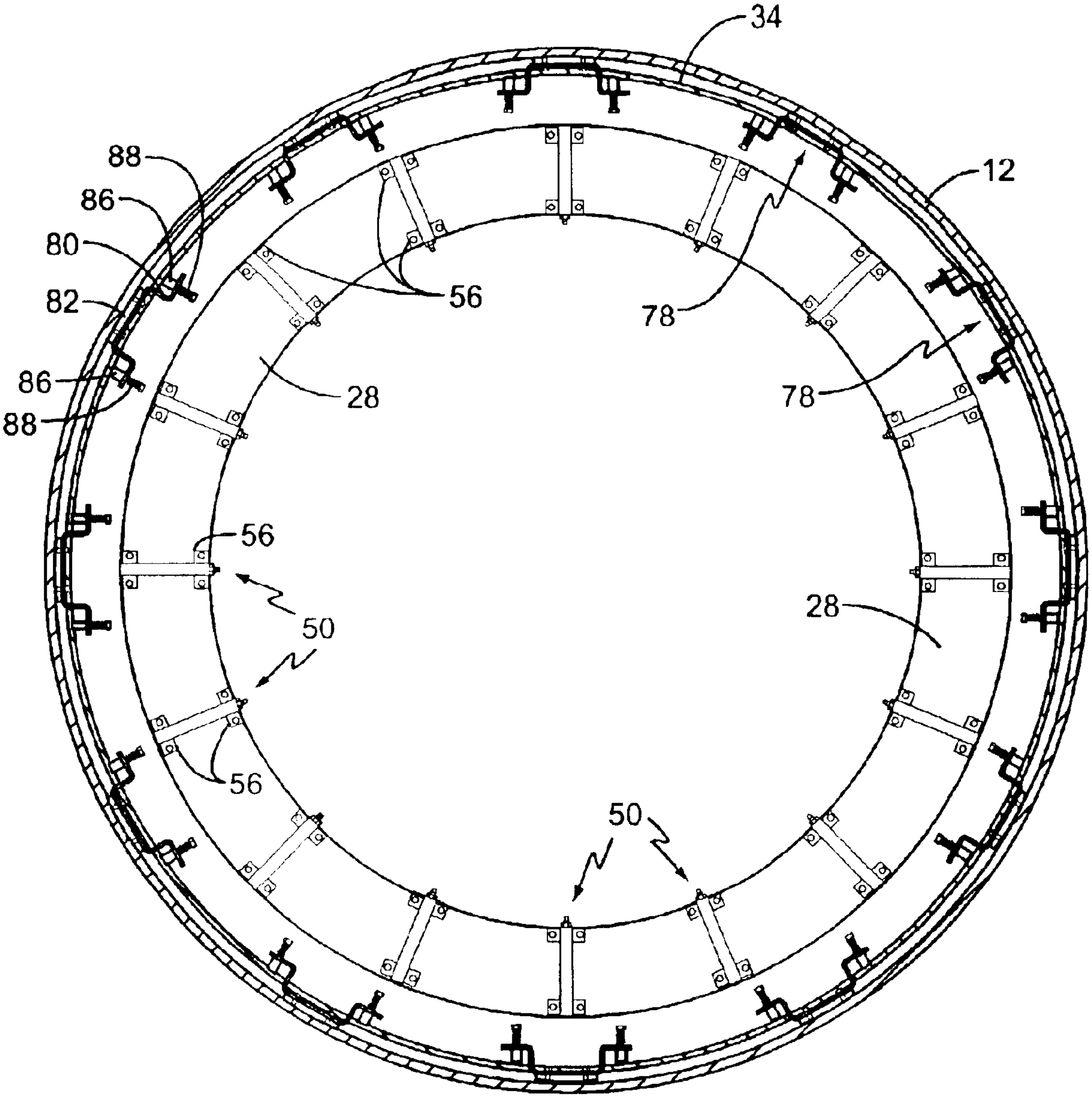
FIG. 6 is a perspective view of an exemplary piston mounted inside of the storage tank.

FIG. 6 illustrates one embodiment of the piston 20 installed in the tank 12. In this embodiment, the tensioners 50 are secured to the mounting plate 28 and are spaced apart at equal intervals. Although the number and arrangement of the tensioners 50 may vary, the tensioners 50 are disposed such that, as the piston 20 moves towards the opening 16, the shaft 52 of each of the tensioners 50 will move radially inward and outward independently of one another responsive to any variations in tank 12. Further, it can be seen that the anti-canting pads 82 mounted to the anti-canting brackets 80 will also move radially inward and outward as required to maintain the piston 20 on a substantially straight path through the tank 12.

Those skilled in the art will realize that many variations may be undertaken without departing from the scope of the invention. For example, although the tank 12 is described herein as cylindrical, it need not be. Other shapes, such as elliptical or oval, may be employed. Thus, the size and shape of the piston 20 may also be modified accordingly.

Further, the present invention is designed to work with any type of fluid material 18. Peanut butter is but one example, however, other viscous fluids, such as grease, oil, ketchup, and the like, may also be stored within the tank 12. Additionally, throughout the description mechanical fasteners are used to secure and mount various parts of the invention. However, it should be understood that the present invention contemplates the use of other fasteners, such as adhesives, and is not limited to the use of mechanical fasteners.

Likewise, the present invention uses a compression spring as a biasing member 68 to provide the biasing force to the seal 40. However, other materials and methods, such as a pressurized fluid or gas, may be used to impart the radial biasing force on the shaft 52 of tensioner 50, which in turn, exerts the force upon the seal 40 as previously described.

The present invention may of course, be carried out in other specific ways than those herein set forth without departing from the essential characteristics of the invention. The present embodiments are, therefore, to be considered in all respects as illustrative and not restrictive and all changes coming within the meaning and equivalency range of the appended claims are intended to be embraced therein.

What is claimed is:

1. A storage tank for storing fluid materials comprising:

a tank having an inner surface and an outlet;

a piston slidably mounted in said tank for expelling material through said outlet;

an annular seal extending around said piston; and a plurality radially movable tensioners for applying a radial force to said seal to maintain said seal in sliding engagement with said inner surface of said tank.

2. The storage tank of claim 1 wherein each said tensioner comprises an axially movable shaft and a tension pad mounted at one end of said shaft.

3. The storage tank of claim 2 wherein each said tensioner further comprises a sleeve to receive said shaft and a biasing member to bias said shaft radially outward to maintain said sliding engagement.

4. The storage tank of claim 3 wherein said biasing member comprises a compression spring.

5. The storage tank of claim 3 wherein said biasing member compresses in response to said shaft moving radially inward.

6. The storage tank of claim 3 wherein each said tensioner further comprises an adjustment mechanism to adjust the amount of biasing force applied to said shaft.

7. The storage tank of claim 1 wherein said seal comprises a crown having a plurality of ridges disposed thereon.

8. The storage tank of claim 7 wherein said seal further comprises a pair of opposing legs having a concave surface.

9. The storage tank of claim 8 wherein said seal is mounted to said piston.

10. The storage tank of claim 1 further comprising a series of access openings disposed circumferentially around said piston member providing access to said seal.

11. The storage tank of claim 1 further comprising a plurality of anti-canting members disposed circumferentially around said piston.

12. A piston comprising:

a head having a proximal surface and a distal neck;

a body mounted to said head;

an annular seal secured to said head, and projecting outward from the circumference of said piston; and a plurality of radially movable tensioners for applying an outward force to the inner surface of said seal.

13. The piston of claim 12 wherein each said tensioner comprises an axially movable shaft and a tension pad mounted at one end of said shaft that engages the inner surface of said seal.

14. The piston of claim 13 wherein each said tensioner further comprises a sleeve to receive said shaft and a biasing member to bias said shaft radially outward.

15. The piston of claim 14 wherein said shaft extends radially through a sidewall of said neck, and stretches said seal radially outward.

16. The piston of claim 14 wherein said biasing member comprises a compression spring.

17. The piston of claim 14 wherein said biasing member compresses in response to said shaft moving radially inward.

18. The piston of claim 14 wherein each said tensioner further comprises an adjustment mechanism to adjust the amount of biasing force applied to said shaft.

19. The piston of claim 12 wherein said seal comprises arcuate crown and a pair of opposing legs having a concave surface, and wherein a selected one of said legs is mounted to a sidewall of said neck.

20. The piston of claim 19 wherein the other leg of said opposing legs is mounted to a flange of said neck.

21. The piston of claim 17 further comprising a plurality of anti-canting members disposed circumferentially around said piston.

22. The piston of claim 21 wherein each anti-canting member is axially movable and comprises an anti-canting pad.

23. The piston of claim 21 wherein each anti-canting member is mounted to said piston by a pair of guiding rods having one end secured to the interior of said piston.

24. The piston of claim 23 further comprising a spring on each said guiding rod to bias said anti-canting member radially outward from said body.

25. A seal for a piston comprising:

an arcuate crown;

a plurality of ridges disposed along the surface of said crown for contacting an exterior surface; and a pair of opposing legs extending from the outer periphery of selected sides of said crown.

26. The seal of claim 25 wherein said plurality of ridges comprises at least one interior ridge.

27. The seal of claim 26 wherein said plurality of ridges further comprises at least one peripheral ridge.

28. The seal of claim 25 wherein said seal is constructed from a generally pliable material.

29. The seal of claim 25 wherein each said leg has a concave surface.

30. A method of expelling a fluid material from within a tank having a piston disposed therein, the method comprising:

stretching an annular seal into sliding engagement with an interior surface of said tank;

sliding said piston member toward an opening in said tank to expel said fluid material through and out the opening; and independently biasing a plurality of tensioners radially outward as said piston member slides towards the opening to maintain said sliding engagement.

31. The method of claim 30 wherein stretching said annular seal member includes biasing an inner surface of said seal radially outward with a plurality of tensioners.

32. The method of claim 30 further comprising independently adjusting said plurality of tensioners to adjust the amount of biasing force applied to said seal.

33. The method of claim 30 further comprising compressing a compression spring within said tensioners responsive to the inward movement of said tensioner as said piston slides towards the opening.

* * * * *